(12) United States Patent
Kangas

(10) Patent No.: US 7,868,619 B2
(45) Date of Patent: Jan. 11, 2011

(54) METHOD AND ARRANGEMENT FOR MONITORING CONNECTIONS OF SWITCH INTENDED FOR ACTIVATING SAFETY FUNCTION

(75) Inventor: Jani Kangas, Espoo (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 12/617,527

(22) Filed: Nov. 12, 2009

(65) Prior Publication Data

US 2010/0156435 A1    Jun. 24, 2010

(30) Foreign Application Priority Data

Dec. 19, 2008    (FI) .................................. 20086219

(51) Int. Cl.
*G01R 31/02* (2006.01)
*H02H 3/00* (2006.01)

(52) U.S. Cl. ........................................ 324/418; 361/79
(58) Field of Classification Search ........................ None
See application file for complete search history.

(56) References Cited

U.S. PATENT DOCUMENTS

| | | | | |
|---|---|---|---|---|
| 4,415,884 A | * | 11/1983 | Delin et al. ................. | 340/500 |
| 4,882,782 A | * | 11/1989 | Kimizuka et al. ........... | 361/100 |
| 6,023,178 A | * | 2/2000 | Shioya et al. ............... | 327/176 |
| 2004/0218317 A1 | | 11/2004 | Kawazu et al. | |

FOREIGN PATENT DOCUMENTS

| | | |
|---|---|---|
| CN | 2583687 Y | 10/2003 |
| CN | 2741058 Y | 11/2005 |
| DE | 2055477 A1 | 5/1972 |
| DE | 220740 A1 | 4/1985 |
| EP | 0563683 A2 | 10/1993 |
| EP | 1 460 497 | 9/2004 |
| SU | 1325384 A1 | 7/1987 |

(Continued)

OTHER PUBLICATIONS

ABB, "Applikationsanleitung Für die Funktion Sicher abgeschaltetes Moment Safe Torque Off (STO-Funktion)" ABB Handbooks-ACSM1 Frequenzumrichter Handbücher, vol. 3AUA0000023089, No. REV B / DE, Oct. 1, 2007, pp. 1-18, XP002512330.

(Continued)

*Primary Examiner*—Jeff Natalini
(74) *Attorney, Agent, or Firm*—Buchanan Ingersoll & Rooney PC

(57) ABSTRACT

A method and an arrangement are disclosed for monitoring connections of a switch intended for activating a safety function, the switch having at least two poles. The arrangement can supply voltages to first sides of two poles of the switch through first connections, and monitor the voltages supplied through the switch and further from second sides of the two poles of the switch to a device through second connections. The arrangement can form a voltage difference between the voltages to be supplied to the first sides of the two poles of the switch, and detect a connection failure when the difference between the voltages supplied to the device does not correspond with the formed voltage difference or when the difference between the voltages supplied to the device is substantially zero.

22 Claims, 6 Drawing Sheets

FOREIGN PATENT DOCUMENTS

WO    WO 2008/068375 A1    6/2008

OTHER PUBLICATIONS

European Search Report issued in corresponding Application No. 09176712.9-2206 dated Mar. 24, 2010.

Finnish Notice of Allowance for Finnish Patent Appl. No. 20086219 dated Sep. 1, 2009.

Finnish Search Resort for Finnish Patent Appl. No. 20086219 dated Aug. 27, 2009.

D. Birtwhistle et al., "A New Technique for Condition Monitoring of MV Metalclad Switchgear", Trends in Distribution Switchgear, Nov. 10-23, 1998, pp. 91-95, Conference Publication No. 459.

* cited by examiner

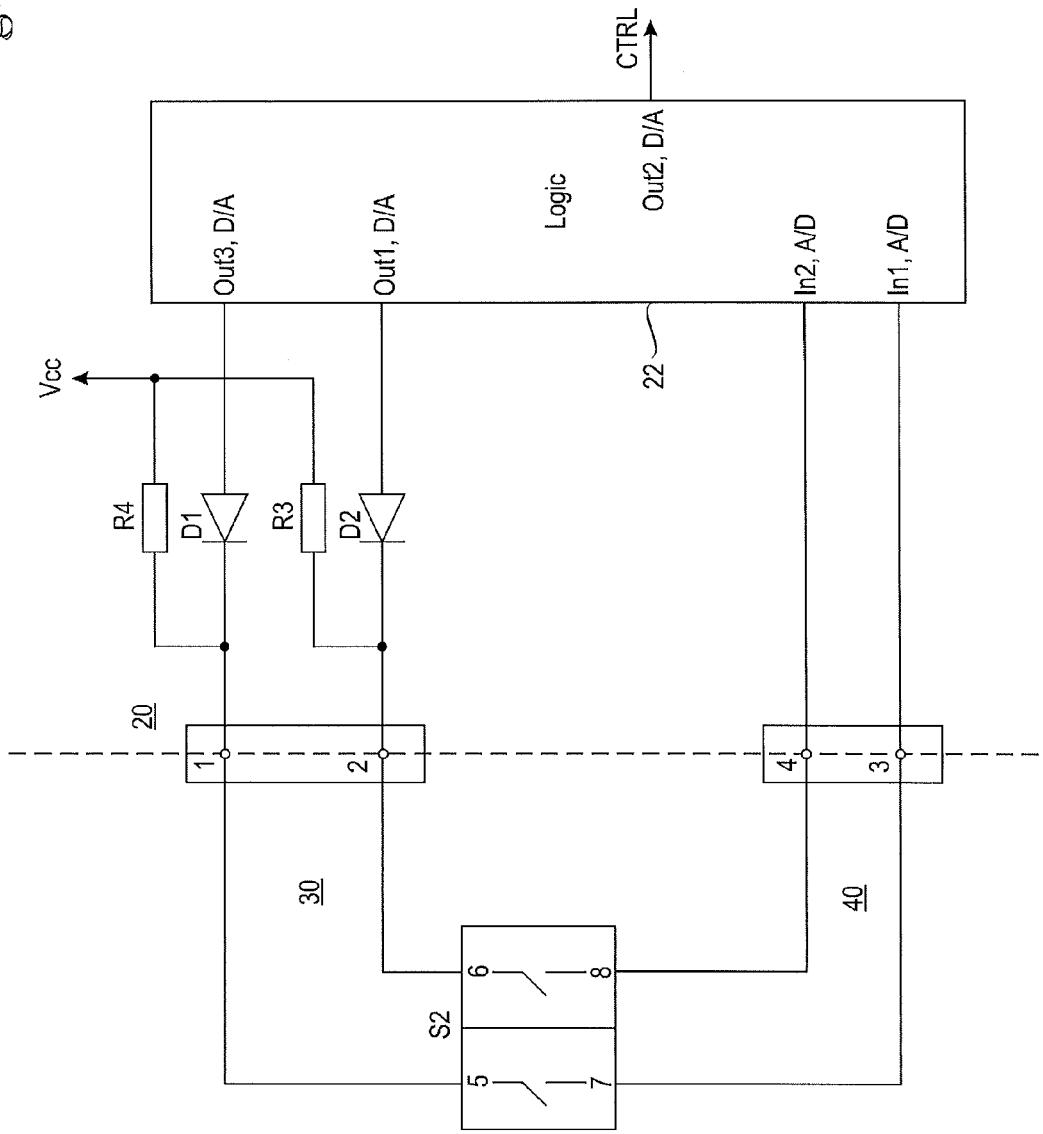

METHOD AND ARRANGEMENT FOR MONITORING CONNECTIONS OF SWITCH INTENDED FOR ACTIVATING SAFETY FUNCTION

BACKGROUND OF THE INVENTION

The present invention relates to a method and an arrangement for monitoring connections of a switch intended for activating a safety function of a device.

An inverter is an electric device which enables a voltage with an alterable frequency to be formed. Typically, inverters are used in connection with motors for controlling the motors at a variable frequency. An inverter may also be a part of a frequency converter which is used e.g. for controlling a motor. In connection with inverters or frequency converters generally comprising inverters, various safety functions are generally applied with the purpose of monitoring and ensuring the safety of e.g. motor drives in different situations and conditions of use. One such safety function is Safe Torque Off (STO). The Safe Torque Off is a functionality defined in IEC61508 standard, whose instructions enable safe devices to be designed in a reliable manner. A desired level for frequency converters is SIL (Safety Integrity Level) 3.

For instance in a frequency converter, the STO function is to ensure that no torque is formed for the motor controlled by the frequency converter if the safety switch has been turned. In the case of the frequency converter application, a user is typically left with the task of installing the pair cables received by the connectors of the STO connection as well as the safety switch having two electrically separate switches. FIG. 1 shows an example of an ordinary coupling of a safety switch 20 associated with the STO function to an inverter 10 of a frequency converter. The figure shows only one phase out of the three phases of the output stage of the inverter, which supplies the motor via phases U2, V2 and W2. The output stage of the inverter is controlled by a control circuit 11 by means of gate drivers 12a and 12b. The STO connection of an inverter (or a frequency converter) is typically provided with four terminals 1, 2, 3, 4 of which two 1, 2 usually have an active voltage supply, e.g. 24 VDC. From these terminals 1, 2 the voltage supply is led to the terminals 3, 4 via the two-pole safety switch 20 and connections 30 and 40. From the terminals 3, 4 the voltage is further supplied e.g. to a control circuit 11 and to be the operating voltage of the gate drivers 12a, 12b. The voltage supply is thus supplied via the safety switch S2 as well as the connections 30 and 40 through two separate connection branches. The task of the safety switch 20 is to cut off this voltage supply, as a consequence of which the STO logic/function has to prevent a moment from being formed to the motor being supplied by the inverter 10. In the exemplary configuration of FIG. 1, opening of the safety switch S2 cuts off both connection branches and thus the voltage supply to the control circuit of the inverter 10 as well to the gate drivers 12a, 12b.

A problem with the above-described coupling of the safety switch is that the pair cable used by the user for the connection of the safety switch may be defective or it may become defective in use. It is therefore advisable to instruct the user to use a sheathed cable for the connections of the safety switch so that e.g. a defective cable that has become squeezed would cause an STO function. However, it may be difficult to find sheathed cables and, in addition, it is difficult to ensure that the user eventually uses an appropriate sheathed cable and grounds the sheath. In the worst case, an ungrounded sheath may short-circuit the conductors of the connection cable which, in turn, may lead to a situation wherein e.g. when one switch is broken the STO function does not work at all. Further, it cannot be ensured that the user couples the switch correctly and uses a two-pole switch.

BRIEF DESCRIPTION OF THE INVENTION

An object of the present invention is to provide a method and an apparatus for implementing the method which avoid the aforementioned drawbacks or at least alleviate them. This object is achieved by the method, arrangement, inverter, and frequency converter according to the invention, which are characterized by what is stated in the independent claims. Preferred embodiments of the invention are disclosed in the dependent claims.

The invention is based on the idea of monitoring the condition of connections of a switch intended for activating a safety function by forming a voltage difference between voltages passing via two poles of the switch and their connections, whereby a connection failure may be detected in response to a difference between the voltages supplied to the device not corresponding with said formed voltage difference or in response to the difference between the voltages supplied to the device being substantially zero.

An advantage of the solution according to the invention is that the working condition of the connections, e.g. a pair cable, used with the switch of the safety function may be monitored either continuously or at desired intervals also during the operation of the device. The solution according to the invention enables the safety of e.g. the Safe Torque Off functionality to be further improved.

BRIEF DESCRIPTION OF THE FIGURES

The invention is now described in closer detail in connection with the preferred embodiments and with reference to the accompanying drawings, in which:

FIG. 7 shows a block diagram of a monitoring arrangement of connections according to an embodiment.

DETAILED DESCRIPTION OF THE INVENTION

Figure 1:
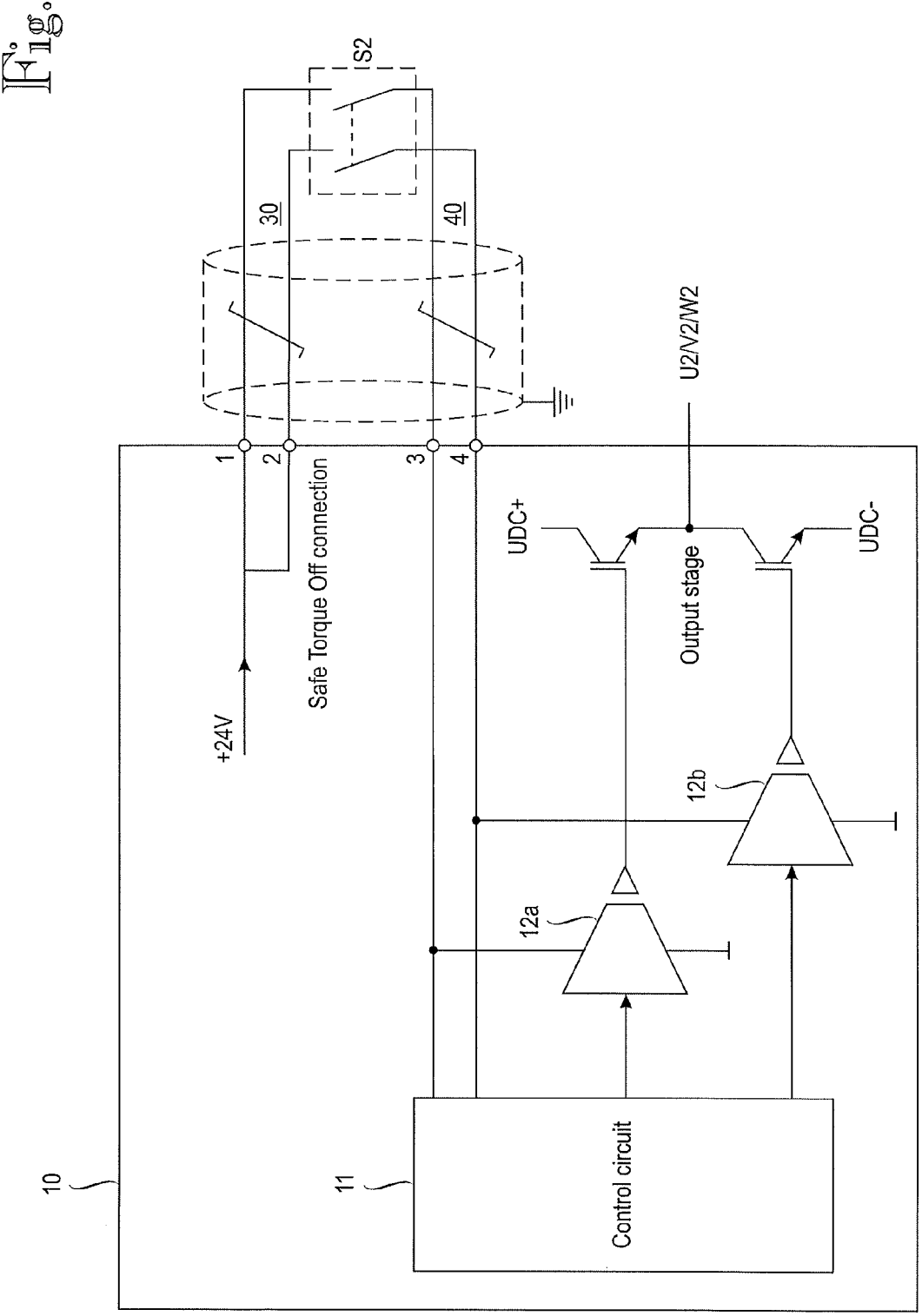
FIG. 1 shows a block diagram of a system to which the invention may be applied.

FIG. 1 shows a block diagram of an arrangement to which the invention may be applied. It is to be noted that use of the invention has not been restricted to be in connection with a device of any particular type, such as a frequency converter or an inverter. Consequently, the structure of the device to which the invention is applied will not be discussed in closer detail in the following. Neither are the voltage levels used relevant to the basic idea of the invention.

The basic idea of the invention is to form a voltage difference between supply voltages of two different poles of connections passing to a device subject to a safety function via a switch intended for activating the safety function, whereby a connection failure may be detected in response to the difference between the voltages supplied to the device not corresponding with said formed voltage difference or to the difference between the voltages supplied to the device being substantially zero. The safety function may be e.g. a Safe Torque Off (STO) function but the invention may also be applied in connection with switch connections of other safety functions. In the following, various preferred embodiments of the invention will be described in closer detail. It is to be noted that the figures associated with the embodiments only show components necessary for understanding the invention.

Figure 2:
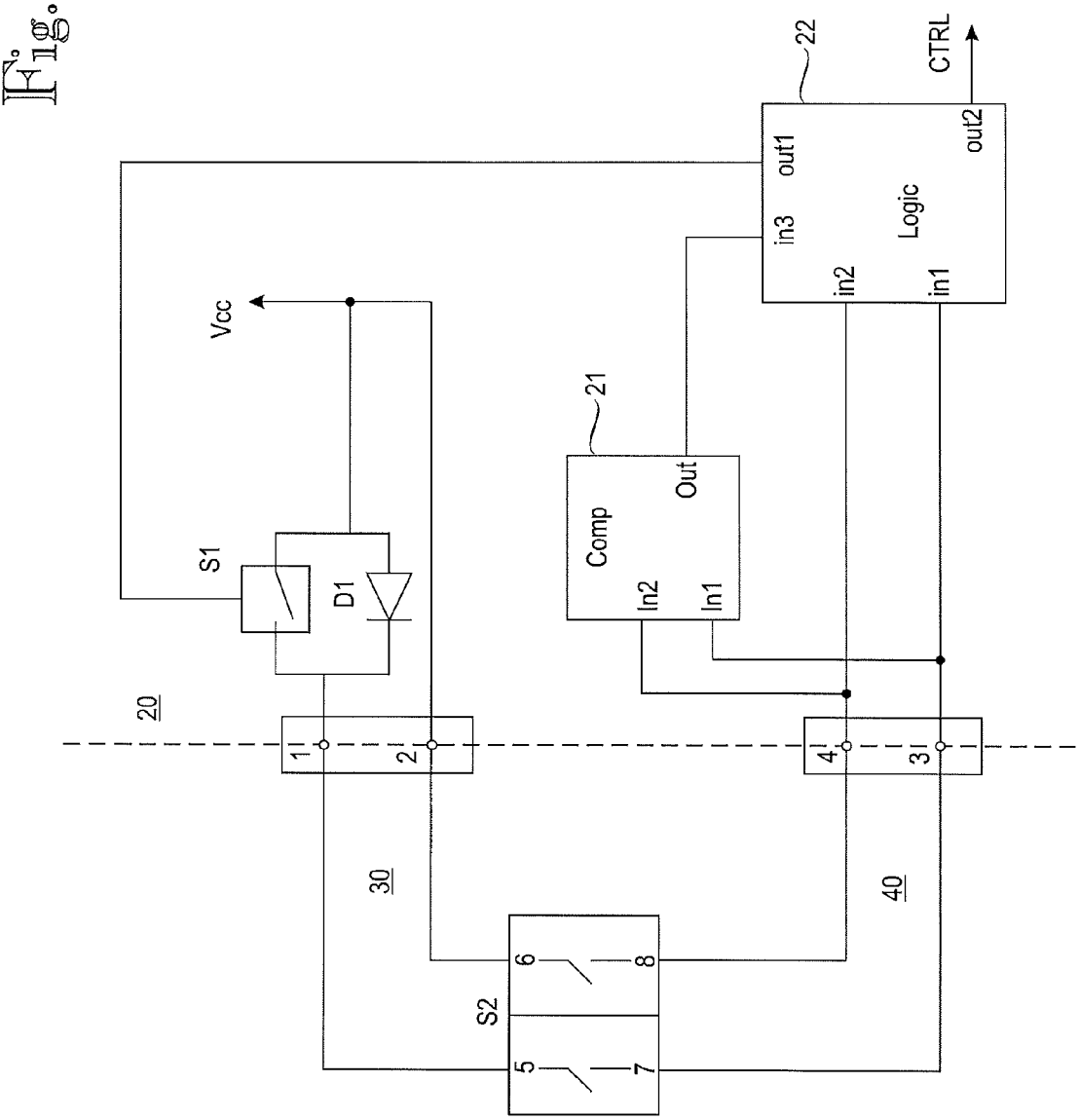
FIG. 2 shows a block diagram of a monitoring arrangement of connections according to an embodiment.

FIG. 2 shows a block diagram of a monitoring arrangement of connections according to an embodiment. In the figure, on the right-hand side of the broken line the functionality and/or components in connection with (inside or outside) a device 20, such as a frequency converter or an inverter, are shown, while on the left-hand side of the broken line a switch S2 intended for activating a safety function as well as its connections 30, 40 to the device 20 are shown. A voltage supply Vcc is divided into two separate branches and the branches are conveyed from the terminals 1 and 2 of the device 20 to the terminals 3 and 4 of the device 20 via the switch S2 as well as the connections 30 and 40. The connection 30 is formed by two separate conductors, e.g. a pair cable or separate wires, and it supplies voltages from the voltage supply to first sides 5 and 6 of the two poles of the switch S2. The connection 40 is also formed by two separate conductors, e.g. a pair cable or separate wires, and further supplies, when the switch S2 is in a conductive state, the voltages supplied to the first sides 5 and 6 of said two poles of the switch S2 from second sides 7 and 8 of said two poles of the switch to the device 20. A diode D1 is used for forming a voltage difference between voltages to be supplied to the first sides 5 and 6 of the two poles of the switch S2. The diode D1, which is coupled in series between the voltage supply Vcc and the first side of one pole of the switch, causes a voltage drop according to its threshold voltage in the voltage of the pole in question, i.e. in the example of the figure, the voltage from the terminal 1 of the device 20 is lower than the voltage from the terminal 2. Depending on the diode, the threshold voltage may be e.g. 0.3 . . . 0.7V. When a greater voltage difference is desired between the different connection branches, two or more diodes D1 may be coupled in series. In this way, the diodes possibly coupled in series may further be of different type in order to achieve a desired voltage drop, for instance. The necessary voltage difference may also be formed by means of some other semiconductor, e.g. a transistor, or some other component or connection or a combination thereof without this being relevant to the basic idea of the invention. Further, the necessary voltage difference may be formed not only by decreasing the voltage of one connection branch but also by increasing the voltage.

Further, in the example of FIG. 2, the voltage is supplied from the terminals 3 and 4 to a logic unit 22 to inputs in1 and in2. The logic unit 22 may be implemented by means of e.g. a microprocessor and suitable software or by means of separate circuits and/or separate components. The logic unit monitors the inputs in1 and in2 and controls the safety function according to the condition of the inputs in an ordinary manner. In the case of the STO function, for example, the logic unit preferably activates the STO function when no control voltage is received by the inputs in1 and in2 (e.g. the switch S2 is open). The activation of the STO function may take place e.g. by means of a control signal CTRL from an output out2, as shown in the figure, the signal e.g. cutting off the voltages of possible gate drivers or otherwise making the STO function active in the device 20. The logic unit 22 could also transmit in a normal state e.g. two voltage signals (not shown in the figure) which would be supplied e.g. to the control circuit 11 as well as to be the operating voltage of the gate drivers 12a, 12b, as in the example of FIG. 1, and cut off these voltages when the STO function is activated. However, the kind of signal or signals by means of which the activation of a safety function, such as the STO function, by the logic unit 22 in the device 20 takes place is not relevant to the basic idea of the invention; thus, in this regard, the implementation depends on the device 20 to which the invention is applied at a given time. Further, in the example of FIG. 2, the voltage is supplied from the terminals 3 and 4 to a comparator unit 21 to the inputs in1 and in2. The comparator 21 compares the magnitude of the voltages received by its inputs in1 and in2 and transmits from its output out a signal which is dependent on the difference in magnitude of the voltages. The output signal of the comparator 21 is conducted to an input in3 of the logic unit 22. When the difference between the voltages supplied to the inputs of the comparator 21 does not correspond with the voltage difference formed between the different connection branches by the diode D1 or in another manner or when the difference between the voltages is substantially zero, the comparator indicates this to the logic unit 22. The comparator may thus simply establish whether or not the voltages supplied to its inputs are equal in magnitude (the difference between the voltages is substantially zero, i.e. differs from zero no more than a certain predetermined amount), and indicate this. Alternatively, the comparator may establish whether or not the difference between the voltages supplied to its inputs corresponds with the formed voltage difference, and indicate this. Preferably, the difference between the voltages corresponds with the formed voltage difference if the voltage differences are equal in magnitude or differ from one another by no more than a predetermined deviation. When the correspondence of the voltage differences is determined such that voltage differences differing by a certain predetermined deviation are also considered to correspond with one another, noise and other interference possibly formed in the voltages along a connection chain that may influence the magnitudes of the voltages may be taken into account When the comparator 21 indicates to the logic unit 22 that the difference between the voltages received by the terminals 3 and 4 of the device does not correspond with the formed voltage difference or that the difference between the voltages is substantially zero, a connection failure is detected and the logic unit may then carry out activation of the STO function and/or e.g. alarm or a notice of defect to the supervisor of the system. The comparator 21 may indicate the result of the comparison to the logic unit 22 e.g. by means of a voltage signal. The comparator may e.g. supply from its output a voltage Vcc (>0V) when the voltages of its inputs in1 and in2 differ in magnitude, and a voltage 0V when the voltages of its inputs in1 and in2 are equal in magnitude. The mentioned indication voltage levels could also be used the other way around or both voltages could differ from zero. This, however, is not relevant to the basic idea of the invention.

The example of FIG. 2 further comprises a switch S1 which enables the diode D1 to be passed and thus a voltage difference to be switched on and off. The switch S1 may preferably be controlled by the logic unit 22 to whose output out1 the swotch S1 is coupled. The logic unit 22 controls the switch S1 preferably according to predetermined rules or conditions which may also be set by the user of the apparatus through an appropriate user interface. It is also possible that the user of the apparatus controls the switch S1 directly, which may also take place via the logic unit 22. On account of the switch S1, the voltage difference is not necessarily formed continuously but only e.g. at determined intervals. This makes it possible to check the circuit already before the start-up of the device 20, such as a frequency converter or a motor connected thereto, and to ensure that the connections associated with the safety function are correct. When the switch S1 is controlled to pass the diode D1 and thus the voltage difference is switched off, the state of the output out of the comparator 21 changes correspondingly. Preferably, the logic unit 22 takes this into account and does not carry out e.g. activation of the STO function when the switch S1 is coupled to be conductive, even though the comparator 21 indicates to the logic unit 22 that the difference between the voltages received by the terminals 3 and 4 of the device does not correspond with the formed voltage difference or that the difference between the voltages is substantially zero.

Figure 3:
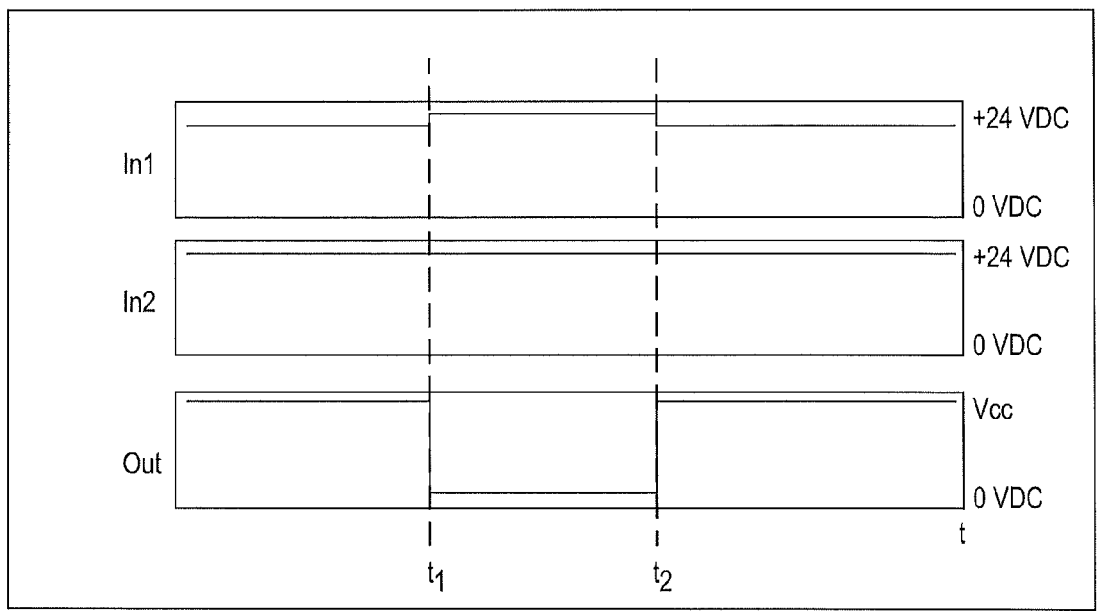
FIG. 3 shows a signal diagram according to an embodiment.

FIG. 3 shows a signal diagram of the inputs in1 and in2 of the comparator 21 according to an embodiment. According to this embodiment, the switch S1 is kept normally open, whereby a diode forms a voltage difference such that the voltage of the input in1 of the comparator 21 is lower than the voltage of the input in2. The magnitude of voltage of the output out of the comparator is then similar to that of e.g. the voltage Vcc. At a time $t_1$ the switch S1 is closed, preferably controlled by the logic unit 22, whereby the voltage difference is switched off when the switch S1 short-circuits the diode D1. If the configuration/circuit operates normally, the voltage of the output out of the comparator changes correspondingly, e.g. 0V. In such a case, the logic unit may conclude that the configuration/circuit is in order and at a time $t_2$ the switch S1 is again opened and the voltage difference is switched back on. The voltage of the output out of the comparator changes correspondingly back to the value Vcc and stays there until the switch S1 is closed again or when the switch S1 is open as a result of a connection failure. If, thus, the switch S1 is open but the comparator 21 yet indicates that the difference between the voltages received by the terminals 3 and 4 of the device does not correspond with the formed voltage difference or that the difference between the voltages is substantially zero, a connection failure is detected in the logic unit. An advantage of this embodiment is that an unexpected short-circuit e.g. between different conductors of the connections 30 or 40 is detected immediately but, in addition, checks may be carried out by means of the logic by coupling the switch S1 to be conductive at intervals. Diagnostics may be carried out continuously, i.e. also when the device 20 is in operation, e.g. a frequency converter drives a motor. Such diagnostics does not prevent or disturb use of the safety switch S2 at any time. It enables a short-circuit of a conductor to a Vcc voltage to be monitored or installation erroneously carried out in a single-pole switch to be detected.

Figure 4:
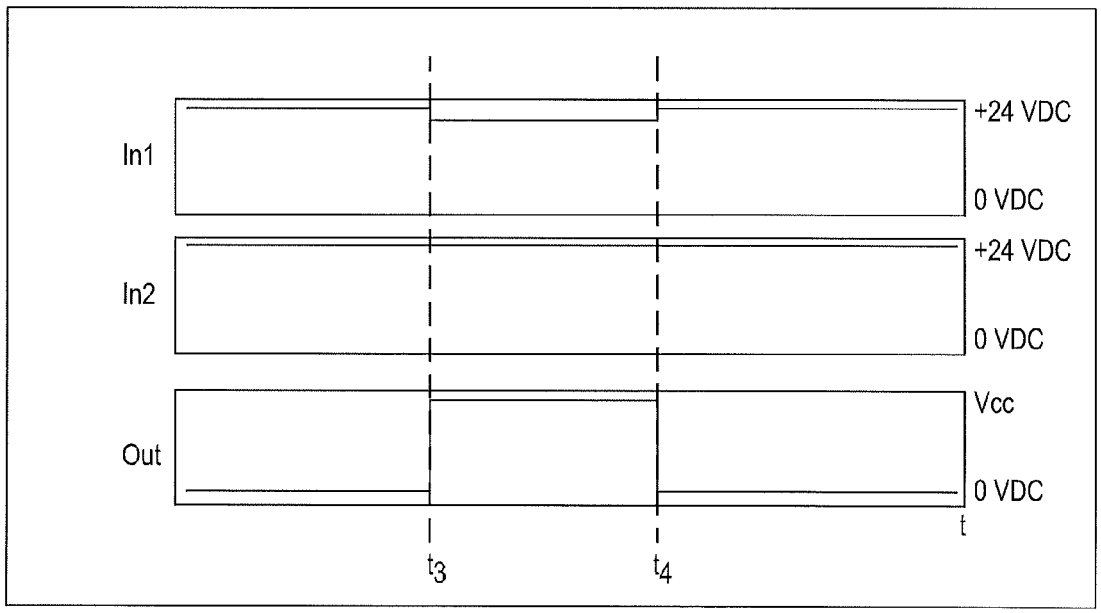
FIG. 4 shows a signal diagram according to an embodiment.

FIG. 4 shows a signal diagram of the inputs in1 and in2 as well as the output out of the comparator 21 according to an embodiment. According to this embodiment, the switch S1 is normally kept closed, whereby the switch S1 short-circuits the diode D1 and the voltage of the input in1 of the comparator 21 is substantially the same as the voltage of the input in2. In such a case, the voltage of the output out of the comparator is e.g. 0V. At a time $t_3$ the switch S1 is opened, preferably controlled by the logic unit 22, whereby the voltage difference is switched on. If the configuration/circuit operates normally and no short-circuit exists between the connection branches in the connection chain 30, S2, 40 being monitored, the voltage of the output out of the comparator 21 changes correspondingly e.g. to the value Vcc. In such a case, the logic unit may conclude that the configuration/circuit is functioning and that the connections are in order. At a time $t_4$ the switch S1 is again closed and the voltage difference is switched off. The voltage of the output out of the comparator changes correspondingly back to the value 0V.

Figure 5:
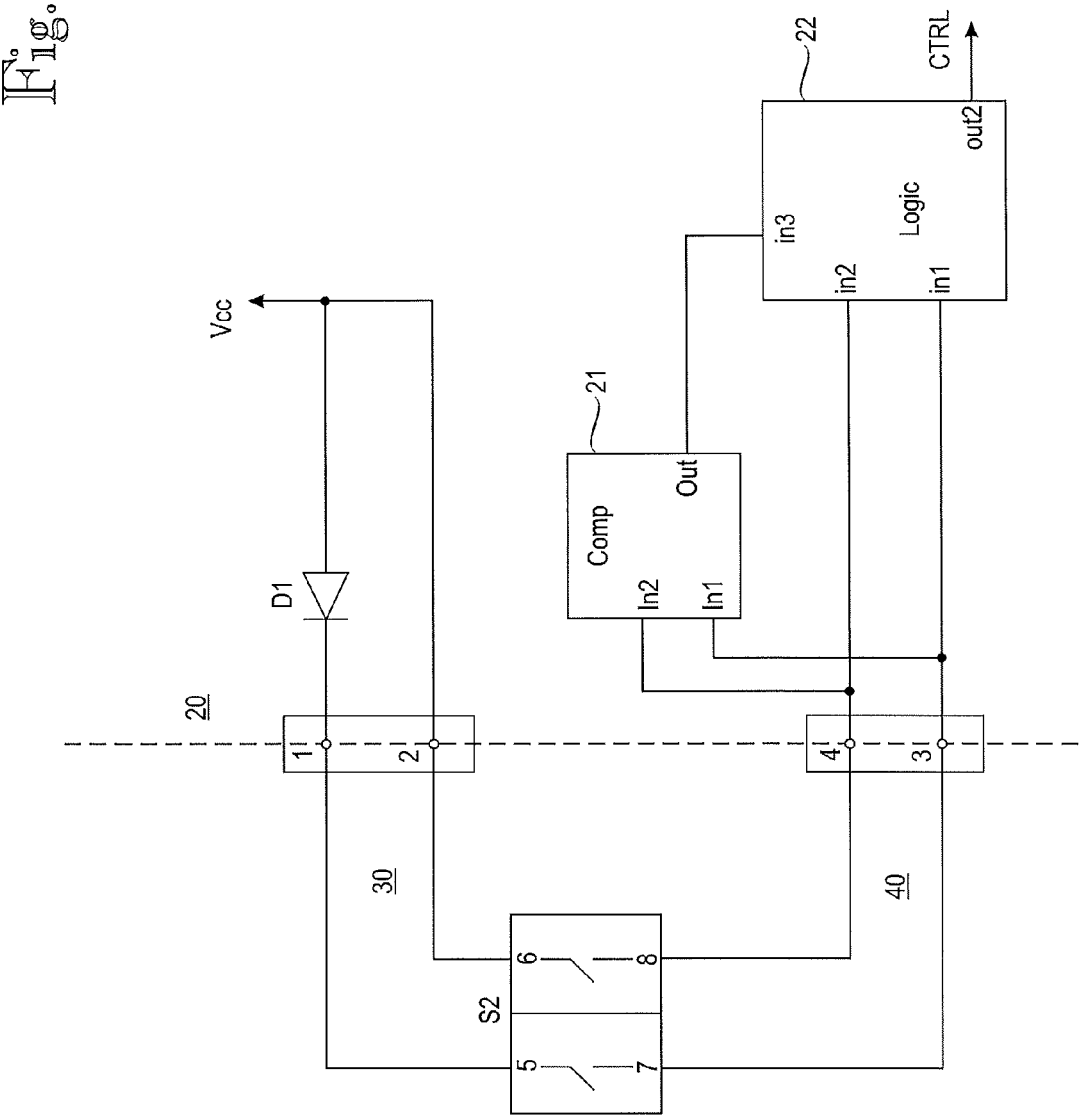
FIG. 5 shows a block diagram of a monitoring arrangement of connections according to an embodiment.

FIG. 5 shows a block diagram of a monitoring system of connections according to an embodiment. The arrangement of FIG. 5 is similar to that of FIG. 2 except that the switch S1 has been omitted. This simplifies the arrangement and the logic unit 22 needs no control functionality of the switch S1, as in the examples described above, but the logic unit only monitors the inputs in1, in2, in3 as well as carries out activation of the STO function and/or e.g. alarm or a notice of default to the supervisor of the system, when necessary.

Figure 6:
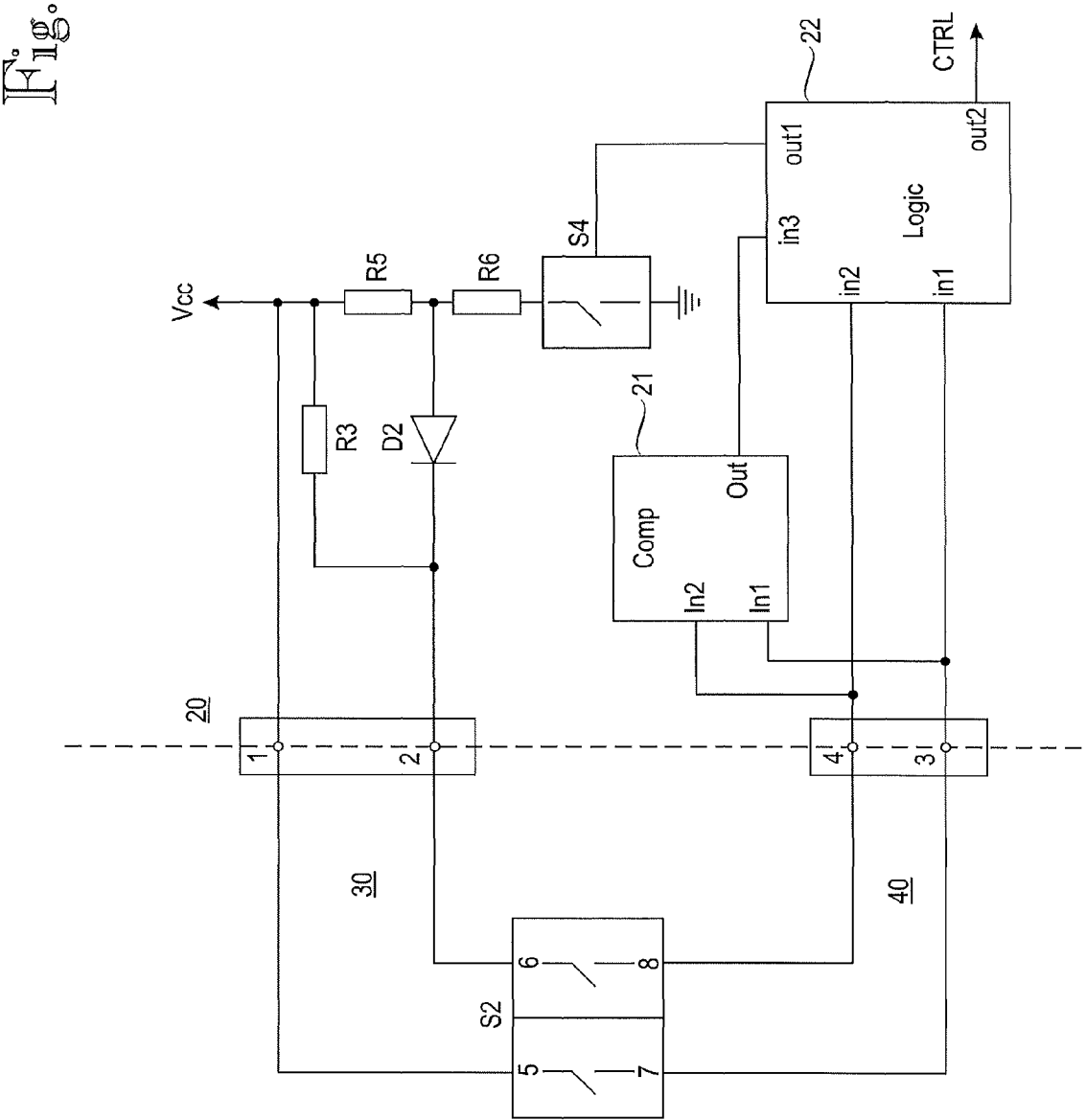
FIG. 6 shows a block diagram of a monitoring arrangement of connections according to an embodiment.

FIG. 6 shows a block diagram of a monitoring system of connections according to an embodiment. In the arrangement of FIG. 6, instead of the diode D1, the voltage is lowered by a resistor division R5 and R6 whose magnitudes are used for determining a desired voltage diagnostics level the comparator 21 is able to recognize. A suitable series resistor R3 and a diode D2 may also be used in the configuration/circuit. The voltage drop may be switched on or off by means of a switch S4, preferably controlled by the logic unit 22 as described in connection with the embodiment of FIG. 2. The diagnostics could also be carried out e.g. such that either of the supply branches is drawn substantially completely to the ground. In the example of FIG. 6, for example, this would take place such that the diode D2 were removed and the resistor R3 had a resistance higher than the resistors R5 and R6 combined. In such a case, the logic unit should preferably know how to take into account that when the switch S4 is in a conductive state and when in one of the supply branches consequently there is 0V, the STO function is not be switched on. This means that the STO function is not available as far as one pole of the switch S2 is concerned when the switch S4 is in a conductive state. However, the ordinary opening of the switch S2 as far as both poles are concerned naturally sets the voltages of both branches of the connection 40 leading to the device 20 to zero, which may be detected in the logic unit 22 and, when necessary, the STO function may be activated.

FIG. 7 shows a block diagram of a monitoring system of connections according to an embodiment. In the example of FIG. 7, the comparator and switch functionalities are combined in the logic unit 22, which is preferably implemented digitally e.g. by means of a processor and software, which is connected to analogue components via D/A and A/D converters. In the example of the figure, only the series resistors R3 and R4 as well as the diodes D1 and D2 have been used as analogue separate components. In the example of the figure, the voltage difference may be formed by means of the logic unit 22.

In the above-described embodiments according to FIGS. 2 to 7, it is also possible that the voltage supply Vcc as well as the means forming the voltage difference are located in a device 20 different from that in which the monitoring of the voltage difference takes place. This enables e.g. the STO connections to be chained such that only one device 20 (or another separate unit) produces the voltage supply and forms the necessary voltage difference between two branches and these two supply voltage branches are conveyed via the switches S2 to one or more other devices 20. In the other devices 20, the monitoring of the voltage difference may be implemented in substantially the same manner as that described in the above-disclosed embodiments. When necessary, information about when the voltage difference is switched on may be relayed from the device 20 forming the voltage supply branches to other devices when an embodiment is applied in which the voltage difference between the branches is not continuously switched on. In this manner, the logic units 22 of the other devices or their corresponding functionalities performing comparison between voltages know when a voltage difference should be detected between the voltage branches. It is also possible that the other devices may request the device forming the voltage supply branches to switch the voltage difference on or off as necessary. Transmission of information and control requests between different devices 20 may take place via a suitable connection between the devices, which may be e.g. a Profibus or a corresponding fieldbus.

The logic unit 22, the comparator unit 21, the switch S1 and other functionalities associated with different embodiments or combinations thereof or possible other equipment may be implemented by means of one or more units. The term "unit" generally refers to a physical or logical entity, such as a physical device or its part or a software routine. The units may be physically separate or implemented as one entity.

The apparatus according to the embodiments of the invention may be implemented at least partly by means of a computer or a corresponding signal processing apparatus provided with suitable software. Such a computer or signal processing apparatus preferably comprises at least a random access memory (RAM) which provides a storage space to be used by arithmetic operations, and a central processing unit (CPU) such as a general-purpose digital signal processing (DSP) processor, which performs the arithmetic operations. The CPU may comprise a set of registers, an arithmetic logic unit and a control unit. The control unit is controlled by a series of program instructions which is transferred to the CPU from the RAM. The control unit may comprise microinstructions for basic operations. The implementation of the microinstructions may vary depending on the structure of the CPU. The program instructions may be coded by a programming language which may be a high level programming language, such as C, Java or the like, or a low level programming language, such as a machine language or assembler. A computer may also comprise an operating system which may provide system services to a computer program written by program instructions. The computer or another apparatus implementing the invention preferably comprises suitable input means for receiving e.g. control data or measurement data from the user and/or other devices and output means for outputting e.g. failure alarms and/or control data as well as for controlling other devices. It is also possible to use special integrated circuits, such as ASICs (Application Specific Integrated Circuit) and/or separate components or other devices for implementing the functionality of the invention according to the different embodiments.

The invention may be implemented in existing systems, such as inverters or frequency converters and/or protective supervision systems of motor drives, or separate elements and devices may be used in a centralized or decentralized manner. The existing devices, such as inverters or frequency converters, typically comprise a processor and a memory which may be utilized in the implementation of the functionality of the embodiments of the invention. Hence, changes and configurations required by the implementation of the embodiments of the invention may be carried out at least partly by means of software routines which, in turn, may be implemented as added or updated software routines. If the functionality of the invention is implemented by means of software, such software may be provided as a computer program product comprising computer code whose execution in a computer causes the computer or a corresponding apparatus to perform the functionality according to the invention according to the above-described embodiments. Such computer program code may be stored on a computer-readable medium, such as a suitable memory means, e.g. a flash memory or disk memory, wherefrom it is readable to a unit or units performing the program code. Further, such program code may be downloaded into a unit or units performing the program code via a suitable data network and it may replace or update possibly existing program code.

It is apparent to one skilled in the art that the basic idea of the invention may be implemented in many different ways. The invention and its embodiments are thus not restricted to the above-described examples but may vary within the scope of the claims.

The invention claimed is:

1. A method for monitoring connections of a switch intended for activating a safety function of a device, the switch having at least two poles, the method comprising:
   supplying, from a voltage supply, voltages to first sides of two poles of the switch through first connections;
   supplying, when the switch is in a conductive state, the voltages supplied to the first sides of said two poles of the switch from second sides of said two poles of the switch further to the device through second connections;
   monitoring the voltages supplied to the device through the first connections, the switch and the second connections;
   forming a voltage difference between the voltages to be supplied to the first sides of said two poles of the switch; and
   detecting a connection failure in response to the difference between the voltages supplied to the device through the first connections, the switch and the second connections not corresponding with said formed voltage difference or to the difference between the voltages supplied to the device through the first connections, the switch and the second connections being substantially zero.

2. The method of claim 1, wherein the difference between the voltages supplied to the device corresponds with the formed voltage difference if the voltage differences are equal in magnitude or differ from one another no more than by a predetermined deviation.

3. The method of claim 1, wherein the voltage difference is formed by means of one or more semiconductors.

4. The method of claim 3, wherein said one or more semiconductors comprise one or more diodes coupled in series between the voltage supply and a first side of one pole of the switch.

5. The method of claim 1, wherein the voltage difference is formed by means of a resistor divider circuit.

6. The method of claim 1, wherein the voltage difference is formed continuously or at determined intervals.

7. The method of claim 1, wherein the difference between the voltages supplied to the device is determined by means of a comparator.

8. The method of claim 1, wherein the first connections comprise separate conductors between the voltage supply and the first sides of said two poles of the switch and the second connections comprise separate conductors between the second sides of said two poles of the switch and the device.

9. The method of claim 1, wherein the safety function is a Safe Torque Off function.

10. The method of claim 1, wherein the device comprises a frequency converter or an inverter.

11. An arrangement for monitoring connections of a switch intended for activating a safety function, the switch having at least two poles, the arrangement comprising:
   means for supplying voltages to first sides of two poles of the switch through first connections;
   means for monitoring the voltages supplied through the switch and further from second sides of said two poles of the switch to a device through second connections;

means for forming a voltage difference between the voltages to be supplied to the first sides of said two poles of the switch; and means for detecting a connection failure in response to the difference between the voltages supplied to the device through the first connections, the switch and the second connections not corresponding with said formed voltage difference or to the difference between the voltages supplied to the device through the first connections, the switch and the second connections being is substantially zero.

12. The arrangement of claim 11, wherein the difference between the voltages supplied to the device corresponds with the formed voltage difference if the voltage differences are equal in magnitude or differ from one another no more than by a determined deviation.

13. The arrangement of claim 11, wherein the means for forming a voltage difference comprise one or more semiconductors.

14. The arrangement of claim 13, wherein said one or more semiconductors comprise one or more diodes coupled in series between the voltage supply and a first side of one pole of the switch.

15. The arrangement of claim 11, wherein the means for forming a voltage difference comprise a resistor divider circuit.

16. The arrangement of claim 11, wherein the means for forming a voltage difference comprise a switch for switching the voltage difference on and off.

17. The arrangement of claim 11, wherein the means for detecting a connection failure comprise a comparator for determining a difference between the voltages supplied to the device.

18. The arrangement of claim 11, wherein the first connections comprise separate conductors between the voltage supply and the first sides of said two poles of the switch and the second connections comprise separate conductors between the second sides of said two poles of the switch and the device.

19. The arrangement of claim 11, wherein the safety function is a Safe Torque Off function.

20. The arrangement of claim 11, wherein the device comprises a frequency converter or an inverter.

21. An inverter comprising an arrangement according to claim 11.

22. A frequency converter comprising an arrangement according to claim 11.

* * * * *